(12) United States Patent
Chen et al.

(10) Patent No.: US 7,666,017 B2
(45) Date of Patent: Feb. 23, 2010

(54) SIM CARD SECURING DEVICE

(75) Inventors: Yi-An Chen, Taipei (TW); Ming-Chang Chiang, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 12/177,880

(22) Filed: Jul. 22, 2008

(65) Prior Publication Data

US 2009/0035977 A1 Feb. 5, 2009

(30) Foreign Application Priority Data

Aug. 3, 2007 (TW) .............................. 96128701 A (51) Int. Cl.
*H01R 13/62* (2006.01)
(52) U.S. Cl. ..................... 439/326; 439/131; 455/558; 455/575.1
(58) Field of Classification Search ................. 439/31, 439/446, 165, 326, 630, 131; 455/558, 575.1
See application file for complete search history.

(56) References Cited

U.S. PATENT DOCUMENTS 6,035,216 A * 3/2000 Cheng et al. ................ 455/558
7,344,401 B2 * 3/2008 Zuo et al. ................... 439/326
2006/0078133 A1 4/2006 Engh et al.

FOREIGN PATENT DOCUMENTS

CN 1295694 5/2001

* cited by examiner

*Primary Examiner*—Tho D Ta
(74) *Attorney, Agent, or Firm*—Jianq Chyun IP Office (57) ABSTRACT

A SIM card securing mechanism applied to a casing of a mobile phone is provided. The SIM card securing mechanism includes a SIM card holder used for carrying a SIM card, a restoring element, an elastic element, and a tenon structure. One end of the SIM card holder is connected to the casing, and the other end thereof has a first blocker. The SIM card holder may be rotated to be held in the casing or be exposed from a recess. One end of the elastic element is fixed on the casing. One end of the tenon structure is connected to the elastic element, and the other end thereof has a second blocker. The SIM card holder is rotated to allow the first blocker to be fastened with the second blocker via the resilience of the elastic element, and the SIM card holder may be held in the casing.

8 Claims, 7 Drawing Sheets

SIM CARD SECURING DEVICE

CROSS-REFERENCE TO RELATED APPLICATION

This application claims the priority benefit of Taiwan application serial no. 96128701, filed on Aug. 3, 2007. The entirety of the above-mentioned patent application is hereby incorporated by reference herein and made a part of this specification.

BACKGROUND OF THE INVENTION

1. Field of the Invention

The invention relates to a subscriber identification module (SIM) card securing device and, more particularly, to rotary SIM card securing device.

2. Description of the Related Art

The SIM card is a card made of plastic, and an integrated circuit (IC) chip is installed therein to execute the function such as recording the basic data of the personal account of the mobile phone, the address list, the subscriber call and the expense.

Figure 1A:
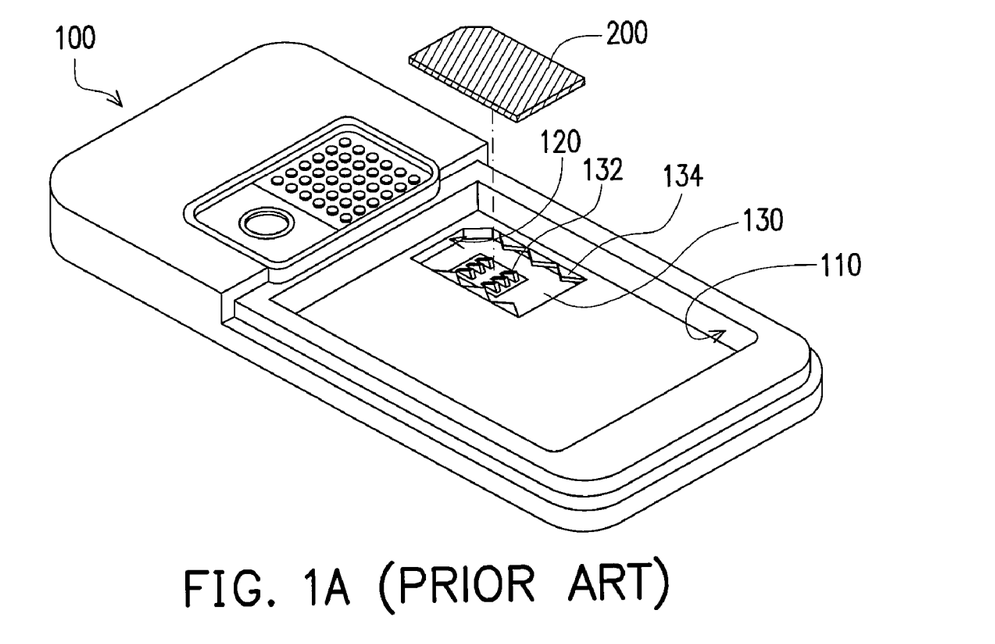
FIG. 1A is a schematic diagram showing a conventional SIM card securing device disposed in a mobile phone.
Figure 1B:
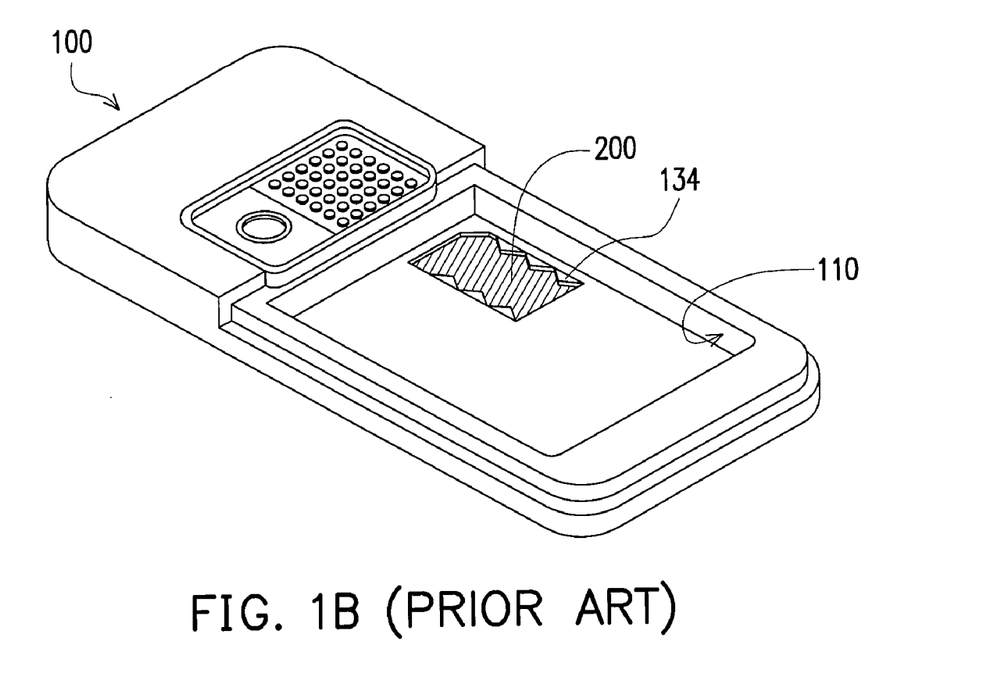
FIG. 1B is a schematic diagram showing the SIM card inserted at the connector and secured by the securing elastic sheets in FIG. 1A.

FIG. 1A is a schematic diagram showing a conventional SIM card securing device disposed in a mobile phone. FIG. 1B is a schematic diagram showing the SIM card inserted to the connector and secured by securing elastic sheets. Generally speaking, the mobile phone 100 has a recess 110 at the back thereof. The recess 110 is used to hold a battery. The recess 110 has another recess 120 additionally to hold the SIM card 200. As shown in FIG. 1A, a SIM card connector 130 is disposed in the recess 120, and it includes a plurality of circuit terminals 132 to be electrically connected to the circuit board (not shown) of the mobile phone and a plurality of securing elastic sheets 134. The securing elastic sheets 134 are used to fix the inserted SIM card 200 to prevent the SIM card 200 from sliding off and ensure that the SIM card 200 closely contacts the circuit terminals 132 on the SIM card connector 130.

The installed SIM card is exposed, and therefore, friction and collision cannot be avoided when the battery is changed. Thus, the SIM card terminal is easily to be damaged. In addition, since the room for inserting the SIM card is not large, the securing elastic sheets are easily to be loose and even be damaged when an improper force is applied in the process of taking the SIM card out.

BRIEF SUMMARY OF THE INVENTION

The invention provides a SIM card securing device which utilizes a concealment design. The SIM card holder usually is concealed in the casing of the mobile phone. When the SIM card needs to be assembled or disassembled, the SIM card holder is rotated to be exposed from the recess at the back of the mobile phone to facilitate the assembly or disassembly of the SIM card. The design ensures the electrical connection between the SIM card and the SIM card connector. In addition, under the hold of the mechanism, the SIM is protected from collision or fall to avoid the deviation.

The invention provides a SIM card securing device adapted to a mobile phone. The mobile phone has a casing having a recess. The SIM card securing device includes a SIM card holder, a restoring element, an elastic element and a tenon structure. The SIM card holder is used to carry a SIM card. One end of the SIM card holder is pivotally connected to the casing rotatably, and the other end has a first blocker. The SIM card holder may be rotated to be held in the casing or be exposed on the recess. The SIM card holder is pivotally connected to the casing via the restoring element to allow the SIM card holder to be exposed on the top of the recess. One end of the elastic element is fixed at the casing. One end of the tenon structure is connected to the elastic element, and the other end of the tenon structure has a second blocker. The SIM card holder may be rotated to allow the first blocker to be fastened with the second blocker via the resilience of the elastic element and to allow the SIM card holder to be held in the casing.

In one embodiment of the invention, the first blocker and the second blocker have a first oblique surface and a second oblique surface corresponding to each other, respectively. When the SIM card holder is rotated to the casing from the top of the recess, the first oblique surface of the first blocker applies a horizontal force to the tenon structure to allow the tenon structure to compress the elastic element. The tenon structure returns to the initial position via the resilience of the elastic element to be fastened with the first blocker.

In one embodiment of the invention, the tenon structure has a push button exposed from the casing.

In one embodiment of the invention, the SIM card holder has an opening to allow the terminals of the SIM card to be exposed from the opening.

In one embodiment of the invention, the restoring element is a torsional spring.

In one embodiment of the invention, the elastic element is a spring.

In one embodiment of the invention, the tenon structure further includes a connecting part via which the tenon structure is connected to the elastic element.

In one embodiment of the invention, the SIM card securing device further includes a pair of guiding plates disposed on the casing to restrict the movement of the tenon structure along a sliding direction.

The SIM card securing device in the invention utilizes the concealment design. The SIM card holder thereof is usually concealed in the casing of the mobile phone. When the SIM card needs to be assembled or disassembled, the SIM card holder is rotated out to be exposed from the recess at the back of the mobile phone to facilitate the assembly or disassembly of the SIM card. The design facilitates the assembly and disassembly of the SIM card and ensures the electrical connection between the SIM card and the SIM card connector to protect the SIM from the friction and collision when the battery is changed thus to avoid damaging the SIM card terminal. In addition, the SIM card is not deviated by the collision or fall under the hold of the mechanism.

These and other features, aspects, and advantages of the present invention will become better understood with regard to the following description, appended claims, and accompanying drawings.

DETAILED DESCRIPTION OF THE EMBODIMENTS

Figure 2A:
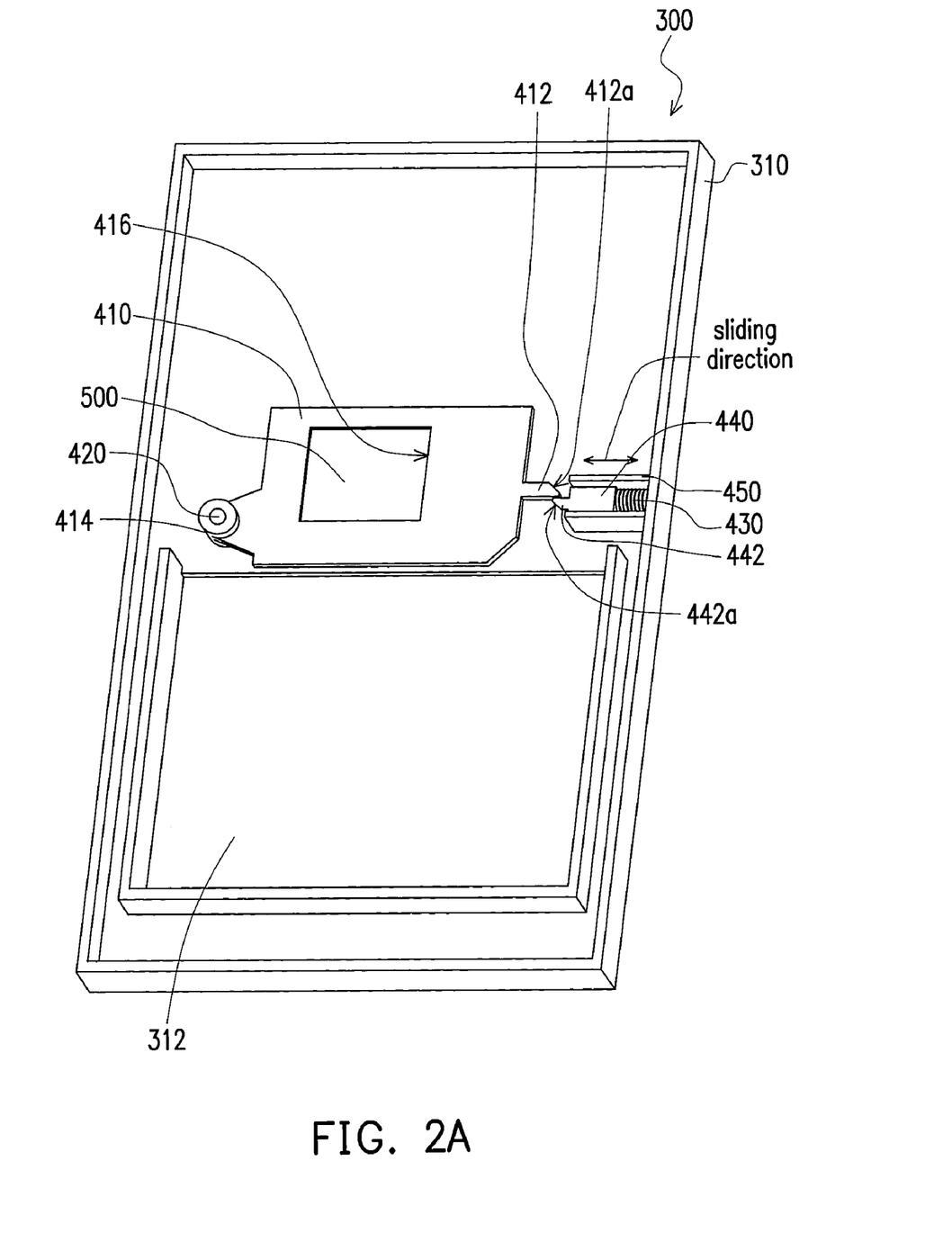
FIG. 2A and FIG. 2B are three dimensional schematic diagrams showing the SIM card securing device of the embodiment when it is in the casing and when it is exposed on the recess, respectively.
Figure 2B:
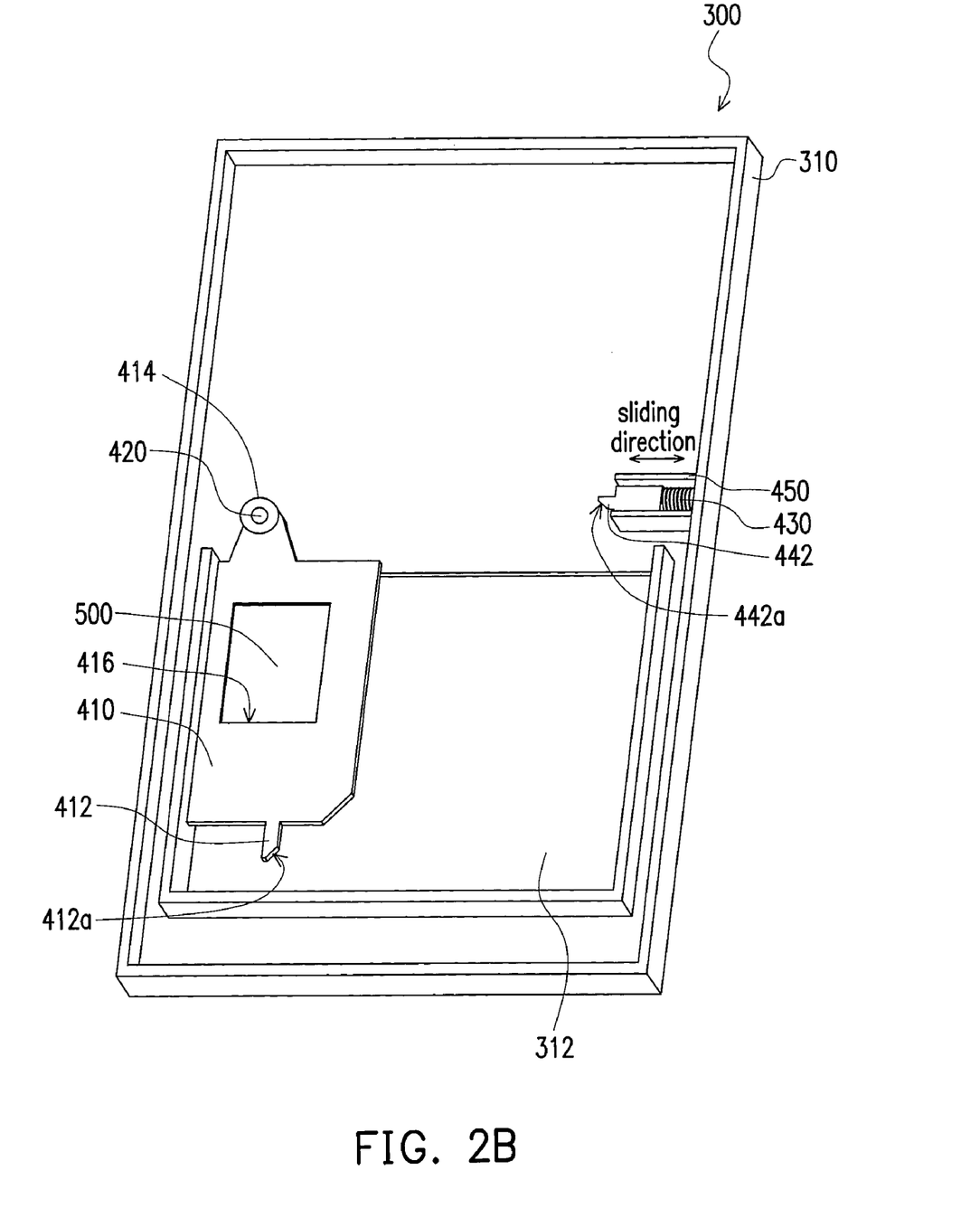
Figure 3A:
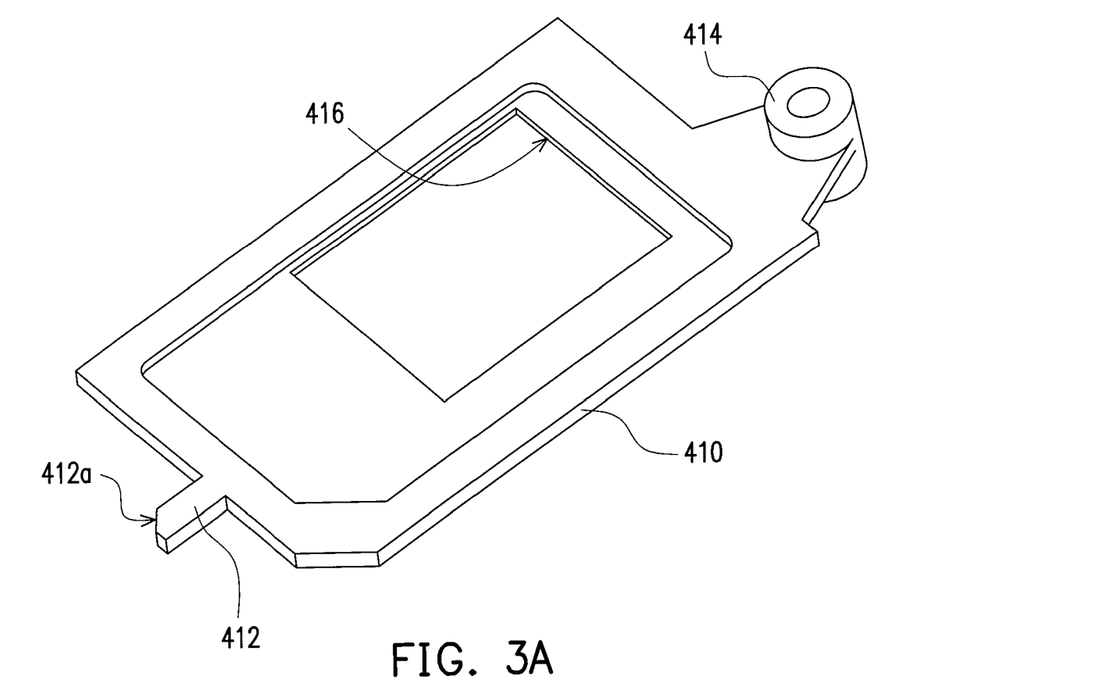
FIG. 3A and FIG. 3B are three dimensional schematic diagrams showing the SIM card holder and the tenon structure of the SIM card securing device in FIG. 2A, respectively.
Figure 3B:
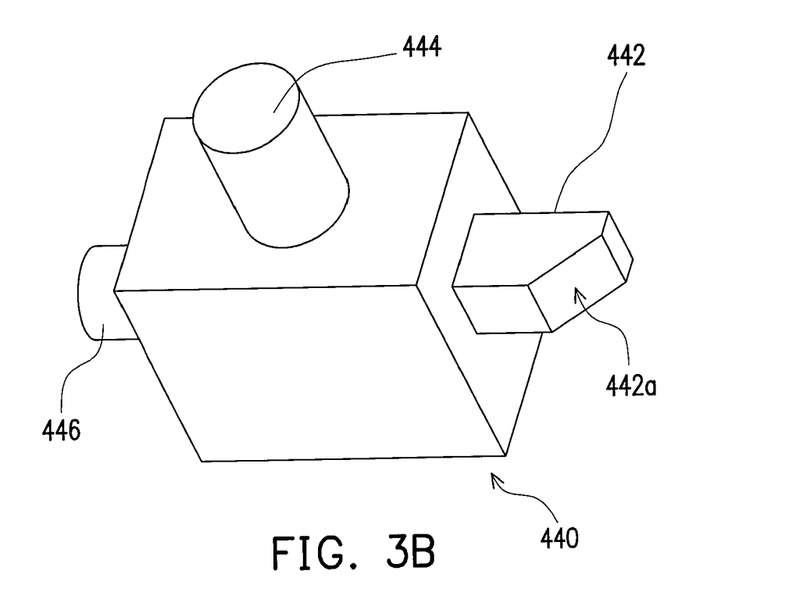

FIG. 2A and FIG. 2B are three dimensional schematic diagrams showing the SIM card securing device of the embodiment when it is in the casing and exposed on the recess, respectively. FIG. 3A and FIG. 3B are three dimensional schematic diagrams showing the SIM card holder and the tenon structure of the SIM card securing device in FIG. 2A. As shown in FIG. 2A and FIG. 2B, the mobile phone 300 has a casing 310 having a recess 312 at the back thereof to hold the battery of the mobile phone 300. The SIM card securing device of the embodiment is disposed in the casing 310 and is adjacent to the recess 312. As shown in FIG. 2B, when a user wants to assemble or disassemble the SIM card, the SIM card holder is rotated to the recess 312 by pushing a push button. Thus, the SIM card may be assembled or disassembled. When the SIM card is assembled or disassembled, as shown in FIG. 2A, the SIM card holder is rotated into the casing 310. The structures of the elements in the SIM card securing device and the connection relationships thereof of the embodiment are described with the drawings.

As shown in FIG. 2A, FIG. 2B, FIG. 3A and FIG. 3B, the SIM card securing device mainly includes a SIM card holder 410, a restoring element 420, an elastic element 430 and a tenon structure 440. As shown in FIG. 2A and FIG. 3A, the SIM card holder 410 is used to carry a SIM card 500. One end of the SIM card holder 410 has a pivotal portion 414, and the other end has a first blocker 412. The SIM card holder 410 is pivotally connected to the casing 310 rotatably via the pivotal portion 414, and it may be rotated to be held in the casing 310 or be rotated relatively to the casing 310. In addition, the SIM card holder 410 has an opening 416 to allow the terminals (not shown) of the SIM card 500 to be exposed from the opening 416 thus to be electrically connected to the circuit board (not shown) of the mobile phone 300.

As shown in FIG. 2A, the SIM card holder 410 can be held in the casing 310. When the SIM card holder 410 is completely held in the casing 310, the first blocker 412 of the SIM card holder 410 is fastened with the tenon structure 440. As shown in FIG. 2B, when the SIM card holder 410 is exposed from the recess 312 of the casing 310, the SIM card 500 is easily to be assembled or disassembled.

The SIM card holder 410 is pivotally connected to the casing 310 via the restoring element 420 to allow the SIM card holder 410 to be exposed on the recess 312. In one embodiment of the invention, the restoring element 420 is a torsional spring.

One end of the elastic element 430 is fixed on the casing 310, and it is opposite to the side where the pivotal portion 414 is provided on the casing 310. In the embodiment, the elastic element 430 is a spring. As shown in FIG. 2A and FIG. 3B, one end of the tenon structure 440 is connected to the elastic element 430, and the other end has a second blocker 442. The SIM card holder 410 may be rotated to allow the first blocker 412 to be fastened with the second blocker 442 via resilience of the elastic element 430. Thus, the SIM card holder 410 is held in the casing 310. Furthermore, the tenon structure 440 further includes a connecting part 446. The tenon structure 440 is connected to the freedom end of the elastic element 430 via the connecting part 446 to allow the tenon structure 440 to move along the sliding direction shown in FIG. 2A. The second blocker 442 is disposed at another side of the tenon structure 440 opposite to the connecting part 446. The second blocker 442 is located on the rotation route of the first blocker 412 in normal to be fastened with the first blocker 412.

In addition, the tenon structure 440 further has a push button 444 exposed from the external surface of the casing 310. Thus, the fastening relationship between the second blocker 442 and the first blocker 4122 may be released by pushing the push button 444. Thus, the SIM card holder 410 rotates to the position shown in FIG. 2B from the position shown in FIG. 2A. A pair of guiding plates 450 may be selectively disposed on the casing 310 to restrict the movement of the tenon structure 440 along the sliding direction.

Furthermore, as shown in FIG. 2A, FIG. 2B, FIG. 3A and FIG. 3B, the first blocker 412 of the SIM card holder 410 and the second blocker 442 of the tenon structure 440 have a first oblique surface 412a and a second oblique surface 442a corresponding to each other, respectively. When the SIM card holder 410 is rotated to the casing 310 from the top of the recess 312, the first oblique surface 412a of the first blocker 412 applies a horizontal force to the second oblique surface 442a of the second blocker 442. The horizontal force pushes the tenon structure 440 to move along the horizontal direction and compresses the elastic element 430. Then, the second blocker 442 do not restrict the rotation of the first blocker 412, and the first blocker 412 gets to the upper side of the second blocker 442. Afterward, the tenon structure 440 returns to the initial position via the resilience of the elastic element 430, and then it is fastened to the first blocker 412 to secure the SIM card holder 410 to the casing 310. On the contrary, when the SIM card 500 needs to be assembled or disassembled, the push button 444 exposed outside the casing 310 is pushed to allow the second blocker 442 of the tenon structure 440 to be separated from the first blocker 412. Thus, the SIM card holder 410 is exposed on the recess 312 via the resilience of the restoring element 420.

Figure 4A:
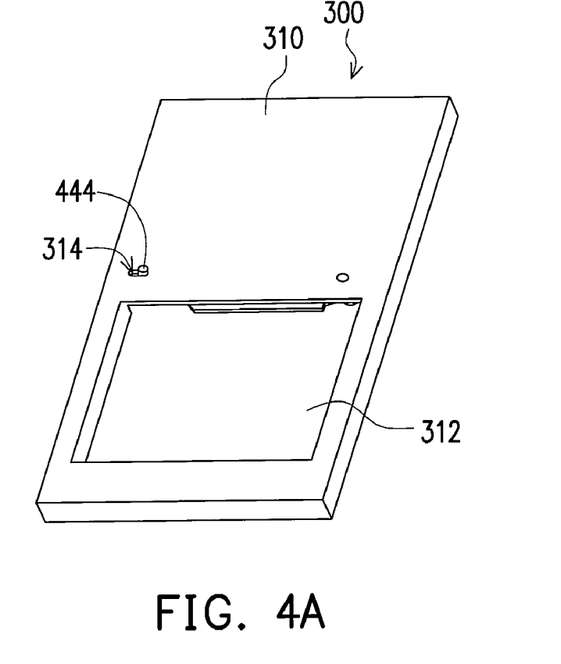
FIG. 4A is a schematic diagram showing the back of the casing of the mobile phone.
Figure 4B:
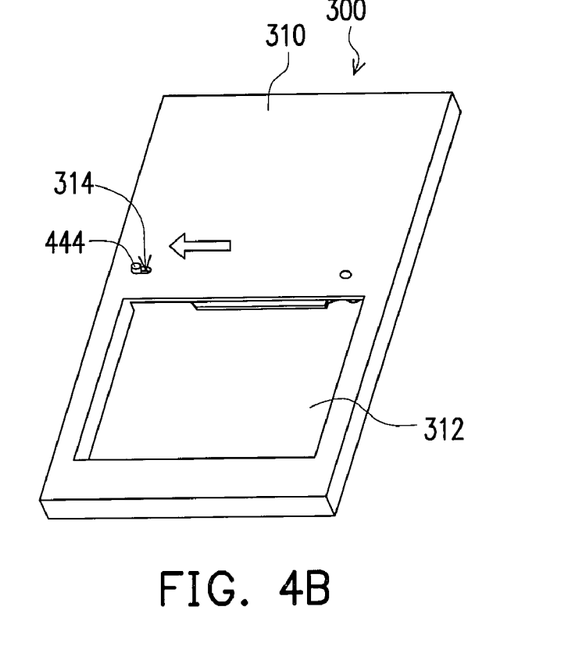
FIG. 4B to FIG. 4D are schematic diagrams showing that the push button is pushed to allow the SIM card holder to be rotated to the assembly position from the hold position.
Figure 4C:
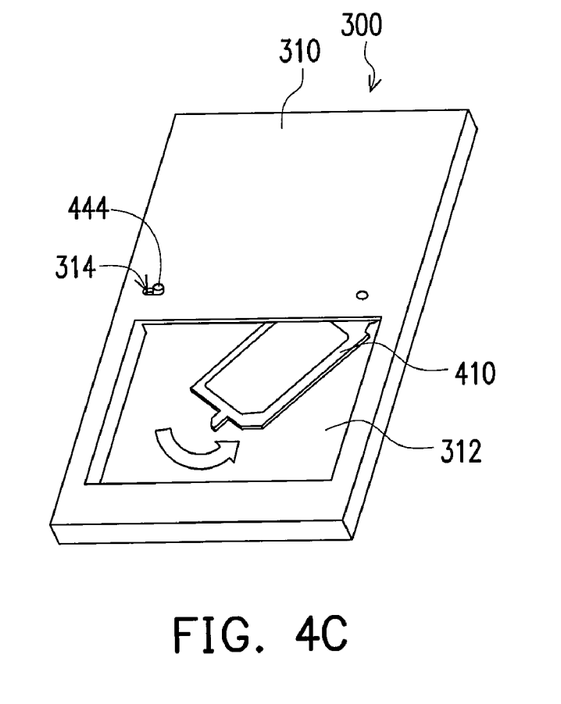
Figure 4D:
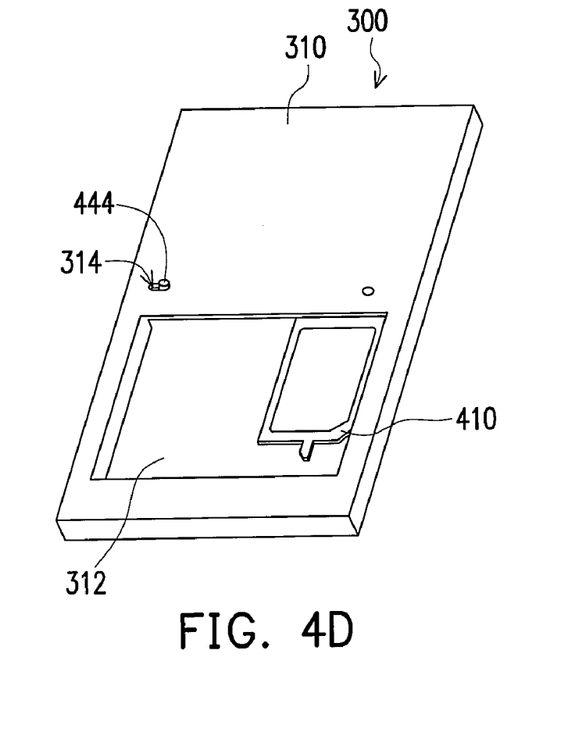
Figure 4E:
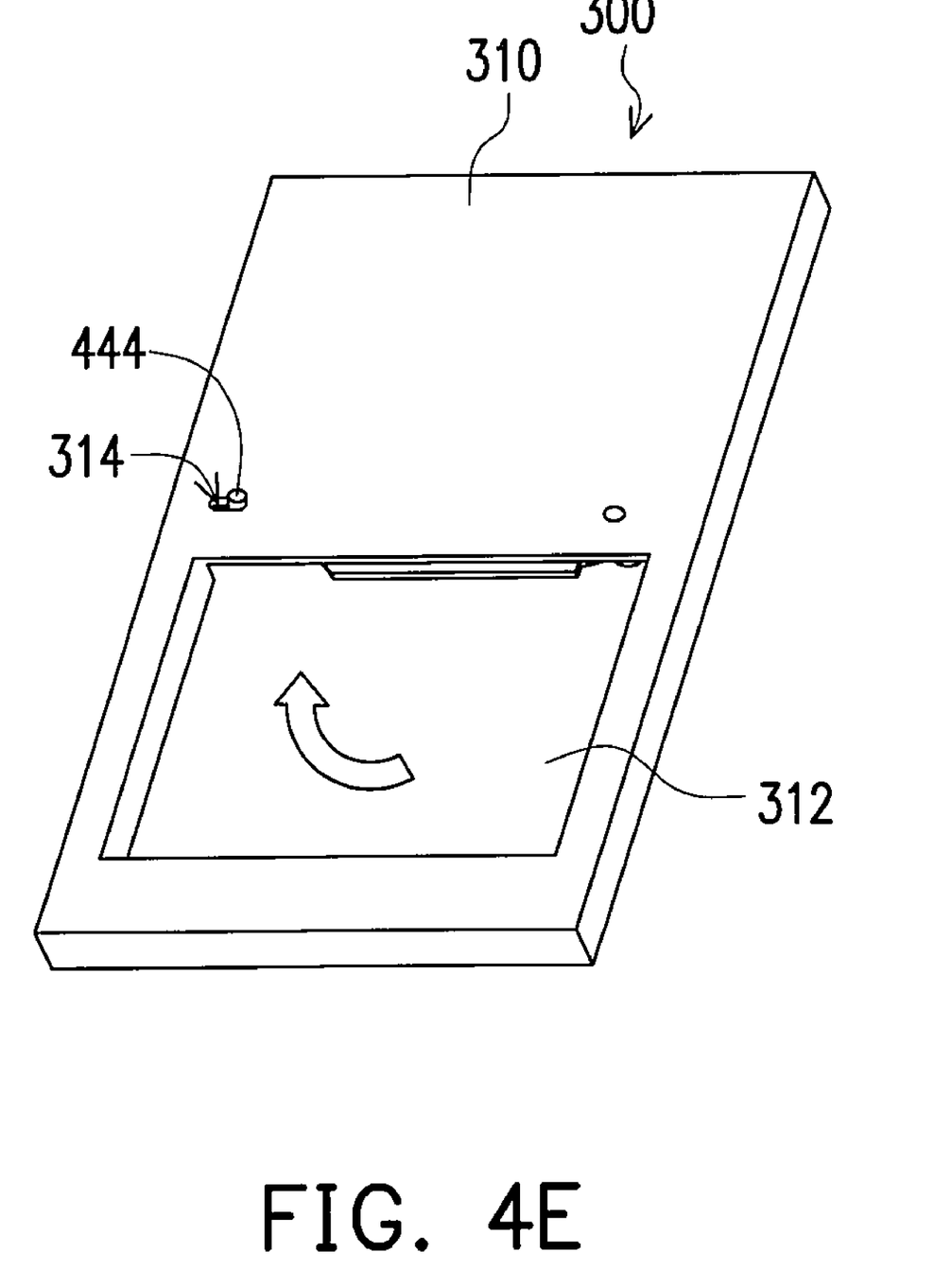
FIG. 4E is a schematic diagram showing that the SIM card holder is rotated to return to the hold position from the assembly position.

FIG. 4A is a schematic diagram showing the back of the casing of the mobile phone. FIG. 4B to FIG. 4D are schematic diagrams showing that the push button is pushed to allow the SIM card holder to be rotated to the top of the recess from the casing. FIG. 4E is a schematic diagram showing that the SIM card holder is rotated to return to the casing from the top of the recess. First, as shown in FIG. 4A, the casing 310 has an opening 314 for exposing the push button 444 of the tenon structure 440, and the push button 444 may move horizontally in the opening 314. As shown in FIG. 4B, when the SIM card needs to be assembled or disassembled, the push button 444 of the tenon structure 440 needs to be pushed first to disassemble the second blocker from the first blocker 412. Afterward, as shown in FIG. 4C and FIG. 4D, the SIM card holder 410 is rotated to the top of the recess 312 from the casing 310 via the resilience of the restoring element 420 to facilitate the assembly or disassembly of the SIM card. As shown in FIG. 4E, after the user assembles or disassembles the SIM card, he only needs to rotate the SIM card holder 410 to the casing 310.

To sum up, the SIM card securing device of the invention is adapted to be used in the mobile phone to secure the SIM card in the casing of the mobile phone. The SIM card securing device mainly includes a SIM card holder and a tenon structure for fastening with the holder. The SIM card holder may be rotated to be held in the casing or be exposed on the recess. The SIM card holder is usually fastened with the tenon structure and located in the casing. If the SIM card needs to be assembled or disassembled, the SIM card holder is disassembled from the tenon structure to allow the SIM card holder to rotate to the top of the recess from the casing to assemble or disassemble the SIM card. The design facilitates the assembly or disassembly of the SIM card and ensures the electrical connection between the SIM card and the SIM card connector to avoid the friction and collision when the battery is changed. Thus, the SIM card terminals are protected from being destroyed. In addition, under the hold of the mechanism, the SIM card does not deviate by the collision or fall.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A SIM card securing device applied to a mobile phone having a casing with a recess, the SIM card securing device comprising:
    a SIM card holder for carrying a SIM card, wherein one end of the SIM card holder is rotatably and pivotally connected to the casing, the other end has a first blocker, and the SIM card holder is capable of rotating to be held in the casing or exposed on the recess;
    a restoring element via which the SIM card holder is pivotally connected to the casing to allow the SIM card holder to be exposed on the recess;
    an elastic element, wherein one end of the elastic element is fixed to the casing; and
    a tenon structure, wherein one end of the tenon structure is connected to the elastic element, the other end of the tenon structure has a second blocker, and the SIM card holder is capable of rotating to allow the first blocker to be fastened with the second blocker via the resilience of the elastic element to allow the SIM card holder to be held in the casing,
    wherein, when the SIM card holder is rotated to the casing from the top of the recess, the first blocker applies a horizontal force to the tenon structure to allow the tenon structure to compress the elastic element, and the tenon structure returns to the initial position via the resilience of the elastic element to be fastened with the first blocker.

2. The SIM card securing device according to claim 1, wherein the first blocker and the second blocker have a first oblique surface and a second oblique surface which are corresponding to each other, respectively, and when the SIM card holder is rotated to the casing from the top of the recess, the first oblique surface of the first blocker applies a horizontal force to the tenon structure to allow the tenon structure to compress the elastic element, and the tenon structure returns to the initial position via the resilience of the elastic element to be fastened with the first blocker.

3. The SIM securing device according to claim 1, wherein the tenon structure has a push button exposed from the casing.

4. The SIM securing device according to claim 1, wherein the SIM card holder has an opening for exposing the terminals of the SIM card.

5. The SIM securing device according to claim 1, wherein the restoring element is a spring.

6. The SIM securing device according to claim 1, wherein the elastic element is a spring.

7. The SIM card securing device according to claim 1, wherein the tenon structure further comprises a connecting part via which the tenon structure is connected to the elastic element.

8. The SIM card securing device according to claim 1, further comprising a pair of guiding plates disposed on the casing to restrict the movement of the tenon structure along the sliding direction.

* * * * *